US006990350B2

(12) United States Patent
Davis et al.

(10) Patent No.: US 6,990,350 B2
(45) Date of Patent: Jan. 24, 2006

(54) OPTICAL WIRELESS NETWORKS WITH ADJUSTABLE TOPOLOGIES

(75) Inventors: Christopher C. Davis, Bowie, MD (US); Stuart D. Milner, Potomac, MD (US); Igor I. Smolyaninov, Columbia, MD (US)

(73) Assignee: University of Maryland, College Park, MD (US)

( * ) Notice: Subject to any disclaimer, the term of this patent is extended or adjusted under 35 U.S.C. 154(b) by 383 days.

(21) Appl. No.: 10/615,182

(22) Filed: Jul. 9, 2003

(65) Prior Publication Data

US 2005/0288031 A1     Dec. 29, 2005

Related U.S. Application Data

(60) Provisional application No. 60/394,521, filed on Jul. 9, 2002.

(51) Int. Cl.
*H04Q 7/20* (2006.01)
(52) U.S. Cl. ............... 455/452.2; 455/41.2; 455/426.1; 455/426.2; 455/370; 455/63.4; 455/338; 455/575.7; 370/329
(58) Field of Classification Search ............ 455/452.2, 455/41.2, 426.1, 426.2, 370, 63.4, 338, 575.7; 370/329; 398/151, 115, 25, 49, 59
See application file for complete search history.

(56) References Cited

U.S. PATENT DOCUMENTS

| 6,680,924 B2 * | 1/2004 | Hills et al. .................. 370/329 |
| 6,847,821 B1 * | 1/2005 | Lewis et al. ............. 455/452.2 |
| 6,920,329 B2 * | 7/2005 | Kennedy et al. ......... 455/456.1 |
| 6,928,266 B1 * | 8/2005 | Nevo et al. ................ 455/63.3 |

* cited by examiner

*Primary Examiner*—William Trost
*Assistant Examiner*—Chuck Huynh
(74) *Attorney, Agent, or Firm*—Rosenberg, Klein & Lee

(57) ABSTRACT

In a free space communication network in which different communication nodes are linked together by directed beams, a method for dynamically configuring the topology of the network allows the transmission directions of the communication nodes to be autonomously changed to communicate with a new node as dictated by the needs of the network. Moreover, the nodes can be switched from directional to broadcast and back again on an as-needed basis. The network consists of a topology that can be rapidly and physically reconfigured as required to provide multiple connectivity, a desired quality of service, or to compensate with the loss of communication links between nodes. The loss of direct communication between any two nodes in an optical network can occur because of obscuration of the atmospheric path between the two nodes. The directed beam which provides the communication channel between the two nodes can, in this situation, be steered to direct its energy towards another accessible node.

32 Claims, 11 Drawing Sheets

OPTICAL WIRELESS NETWORKS WITH ADJUSTABLE TOPOLOGIES

This application claims the benefit of Provisional Application No. 60/394,521, filed Jul. 9, 2002.

STATEMENT REGARDING FEDERALLY SPONSORED RESEARCH OR DEVELOPMENT

The development of the invention described herein was funded by the U.S. Government through Contract DAAB0701CKZ17 granted by the U.S. Army and through ContractF306020020510 granted by the U.S. Air Force Research Lab. The U.S. Government has certain rights in this invention.

FIELD OF THE INVENTION

This invention relates to dynamically reconfigurable communication networks. More specifically, the present invention is directed to communication networks wherein the communication links thereof are established over a plurality of directed beams and wherein the physical topology thereof can be reconfigured by redirecting any of the directed beams of a node to a new node in the communication network.

BACKGROUND OF THE INVENTION

Direct line-of-sight optical communications has a long history. The use of directed beams, such as lasers for this purpose is the latest incarnation of this technology. It has become known as optical wireless (OW) or free-space optical (FSO) communications. Although OW test systems of this sort were developed in the 1960's, the technology was not widely accepted. Optical fiber communications had not been developed, and a need for a high-bandwidth bridging technology did not exist. The proliferation of high-speed optical fiber networks has recently created the need for a high-speed bridging technology that will connect users to the fiber network, since most users do not have their own fiber connection. This has commonly come to be known as the "first" or "last" mile problem.

Radio frequency (RF) wireless systems may be used as a solution to the bridging problem, however they are limited in data rate due to the low carrier frequencies involved. In addition, because "broadcast" technology is generally regulated, it must be operated within allocated regions of the electromagnetic spectrum. Spread-spectrum RF, especially emerging ultra-wideband (UWB) technology, is able to avoid spectrum allocations provided transmit powers are kept low. However, this generally limits the range to a few tens of meters.

With the implementation of dense wavelength-division multiplexing (DWDM), the information-carrying capability of fiber optic networks has increased enormously. At least 10 Tb/s of capacity on a single fiber has been demonstrated. This capacity would, in principle, allow the simultaneous allocation of 10 Mb/s each to one million subscribers on a single fiber backbone. The problem is, however, to provide these capacities to actual subscribers, who in general do not have direct fiber access to the network. Currently, the maximum that is available to most consumers is wired access to the network, since fiber comes to the telephone company's switching stations in urban or suburban areas, but the consumer has to make the connection to the station. Clever utilization of twisted-pair wiring has given some consumers network access at rates from 128 kb/s to 10 Mb/s, although at most access of this kind through digital subscriber lines (DSL) is limited to about 1.5 Mb/s. Cable modems are able to provide access at rates of about 30 Mb/s, however multiple subscribers must share a cable, and simultaneous usage by more than a few subscribers drastically reduces the data rates available to each. The bridging problem possibly may be solved by laying optical fiber to each subscriber, yet this would be without the demand for the service from enough subscribers, the various communications service providers are generally unwilling to commit to the investment involved which is estimated at $1,000.00 per household.

Optical wireless provides an attractive solution to the first-mile problem, especially in densely populated urban areas. Optical wireless service may be provided on a demand basis without the extensive prior construction of an expensive infrastructure. Optical transceivers can be installed in the windows or on the rooftops of buildings and communicate with a local communication node, which provides independent optical feeds to each subscriber. In this manner, only paying subscribers receive the service. The distance from individual subscribers to their local node would generally be kept below 300 meters, and in many cases, in cities with many high-rise apartments, this distance will be less than 100 meters. These distances are kept small to insure reliability of the optical connection between subscriber and node.

Deployment of optical wireless network architectures and technologies as extensions to the internet is contingent on the assurance that their dynamic underlying topologies are controllable with insured and flexible access. In addition, this wireless extension must provide compatibility with broadband wire line networks in order to meet requirements for transmission and management of terabytes of data.

The RF spectrum is becoming increasingly crowded and demand for available bandwidth is growing rapidly. As a result, OW communication as a primary means for communication is becoming more appealing. At the low carrier frequencies of RF communication, even with new bandwidth allocations in the several gigahertz region, individual subscribers can obtain only modest bandwidths, especially in dense urban areas. Since conventional wireless is a broadcast technology, all subscribers within a cell must share the available bandwidth, cells must be made smaller, and their base station powers must be limited to allow spectrum re-use in adjacent cells.

Recent research has shown that multi-hop, RF wireless networks, i.e., RF peer-to-peer or "infrastructure-less" networks are generally not scalable, and the size and number of users is limited. Optical wireless provides an attractive way to circumvent such limitations. This line-of-sight communication technology avoids the wasteful use of both the frequency and spatial domains inherent in broadcast technologies. Optical wireless provides a secure, high data rate channel exclusively for exchanging information between two connected parties. There is no spectrum allocation involved since there is no significant interference between different channels, even between those using the exact same carrier frequency. Thus, this technology provides a secure communication network for critical applications, such as on a field of battle during a war conflict.

A fundamental difficulty arises in the use of directed beams to communicate information between opposing nodes of a communication network in that the communication between nodes is terminated if the directed beam is obscured or obstructed. Thus, there is an apparent need for a method to reroute communications in such an event, while maintaining the integrity of the network with a minimal amount of interruption of service.

SUMMARY OF THE INVENTION

The present invention is directed to a method for dynamically configuring the topology of communication networks consisting of a plurality of nodes. The method of the instant invention is performed at every node in the communication network. The method first determines the locations of selected nodes for which a communication link is to be established from each node in the network. The selected nodes are selected from all of the nodes in the network in accordance with predetermined network topology parameters, such as distance between nodes and a desired data throughput. The method then steers one of a plurality of directed beams located at each node toward a corresponding one of the selected nodes to establish a respective communication link. It is then determined if the network topology is such that all of the nodes are connected by communication links to form a closed signal path amongst all the nodes of the network. The communication quality of each of the communication links is constantly monitored against a predetermined link quality parameter. If the communication quality of a particular communication link fails to meet the link quality parameter, the directed beam corresponding to the node for which the communication quality is failing is redirected to another of the plurality of nodes to establish a new communication link therewith.

DETAILED DESCRIPTION OF THE PREFERRED EMBODIMENTS

Figure 1A:
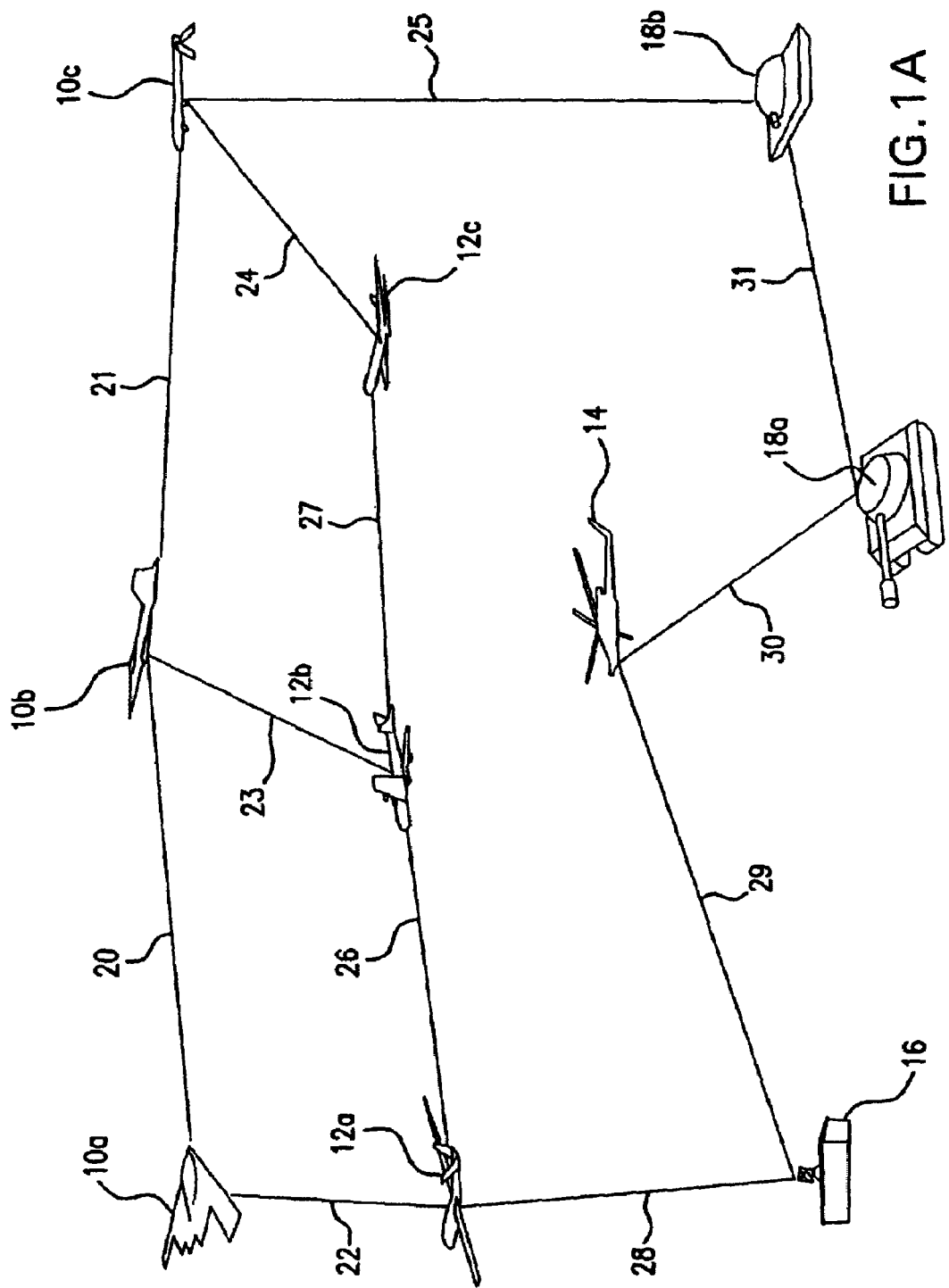
FIGS. 1A–1E are block diagrams illustrating the method of the present invention in a battlefield setting.

Referring to FIG. 1A, there is shown an exemplary embodiment of a communication network for which the method of the present invention provides substantial benefit. FIG. 1A represents various equipment that may compose a military combat setting. While the present invention has a much broader field of application than the illustrated military combat setting (such as providing a solution to the last mile problem discussed above), combat communications pose particular problems for which the present invention is well adapted. First, inter-vehicular communication on the field of combat should be secure to avoid unwanted enemy surveillance thereof. The present invention makes use of directed beams of electromagnetic radiation, such as beams of laser light, for carrying an information signal between the nodes of the network. By conveying network traffic on the directed beams between network nodes, the information carried thereon is not broadcast and is shared only between the two nodes at opposing ends of the communication link formed by the directed beam.

Another problem in maintaining a communication network between elements on a battlefield is in the fact that most of those elements are mobile and are in constant motion. While this does not necessarily pose a problem to a broadcast communication network, the use of directed beams in forming the communication links between moving nodes requires the directed beams to be accurately pointed to the node with which it communicates, regardless of its instantaneous position. The present invention implements tracking facilities so that the directed beams are continuously pointed toward a corresponding node, even when both nodes are in motion.

Battlefield communications, when implemented by the directed beam network of FIG. 1A, are vulnerable to localized outages, either by the directed beams being interrupted by an obstruction, or by the dropping of a network node. Obstructions to the directed beams include buildings, ground cover, clouds, and fog. The present invention can reconfigure its topology, i.e., re-direct the directed beams towards alternative nodes in the network, when an obstruction to a particular beam is impenetrable. On the other hand, in the case of fog where an obscuration is translucent, the present invention implements methods to adjust the transmitted power density so as to maximize a received power at the corresponding network node. As will be discussed hereinbelow, one such power maximization technique lies in the alteration of the beam divergence of the transmitted beam.

As previously described, a further complication in a node-to-node network in a combat situation lies in dropped or lost nodes. This complication may occur when a piece of equipment leaves the battlefield or is destroyed. The present invention incorporates facilities to re-route the network traffic around the dropped node by reconfiguring the physical topology of the network itself. Thus, secure communications over the communication links formed by the directed beams is maintained virtually without interruption through a variety of failures that would be catastrophic in other prior art networks.

Examining FIG. 1A in more detail, the nodes of the battlefield communication network are formed at each vehicle or permanent installation in a particular region of battle. At a battlefield commander's discretion, the equipment in the operational theater may be aggregated into a plurality of tiers. As shown in the FIG. 1A, high altitude aircraft 10a, 10b, 10c populate an uppermost tier, with mid-altitude aircraft 12a, 12b, 12c flying therebelow to form an intermediate tier of communication nodes. Below the intermediate tier, low-level aircraft, such as helicopter 14, form a low altitude tier. Finally, a ground-based tier is composed of ground-based vehicles 18a, 18b and a stationary facility 16.

Each node of the network is connected to other nodes via a number of communication links in the form of directed beams. In FIG. 1A, each node terminates either of two communication links, in which case the node is bi-connected or is a node of order 2, or three communication links, in which case the node is tri-connected or is a node of order 3. An example of a bi-connected node is at high-altitude aircraft 10a, which terminates communication links 20 and 22 and an example of a tri-connected node is at high-altitude aircraft 10b, which terminates communication links 20, 21 and 23. Although only nodes of order 2 and order 3 are illustrated in the Figure, nodes of any order greater than 1 are within the scope of the present invention.

As discussed previously, each node is connected to other nodes in the network via communication links 20–31 in the form of directed beams of electromagnetic radiation, such as laser light. The physical mechanisms as well as the controlling algorithms thereof are discussed in detail in paragraphs that follow. For the purposes of the present discussion, the communication links 20–31 are formed by a sufficiently narrow beam to convey an information signal between only those nodes at either end of the particular communication link. Thus, the information is prevented from being broadcast and the information signal is contained within the network and is shared only with the nodes thereof.

The directed beams forming the corresponding communication link 20–31 are not only narrow and well-contained, but each are independently steerable at each node. As will be shown below, this important aspect of the invention provides the mechanism for which the network topology can be physically altered responsive to varying network demands and conditions.

Figure 1B:
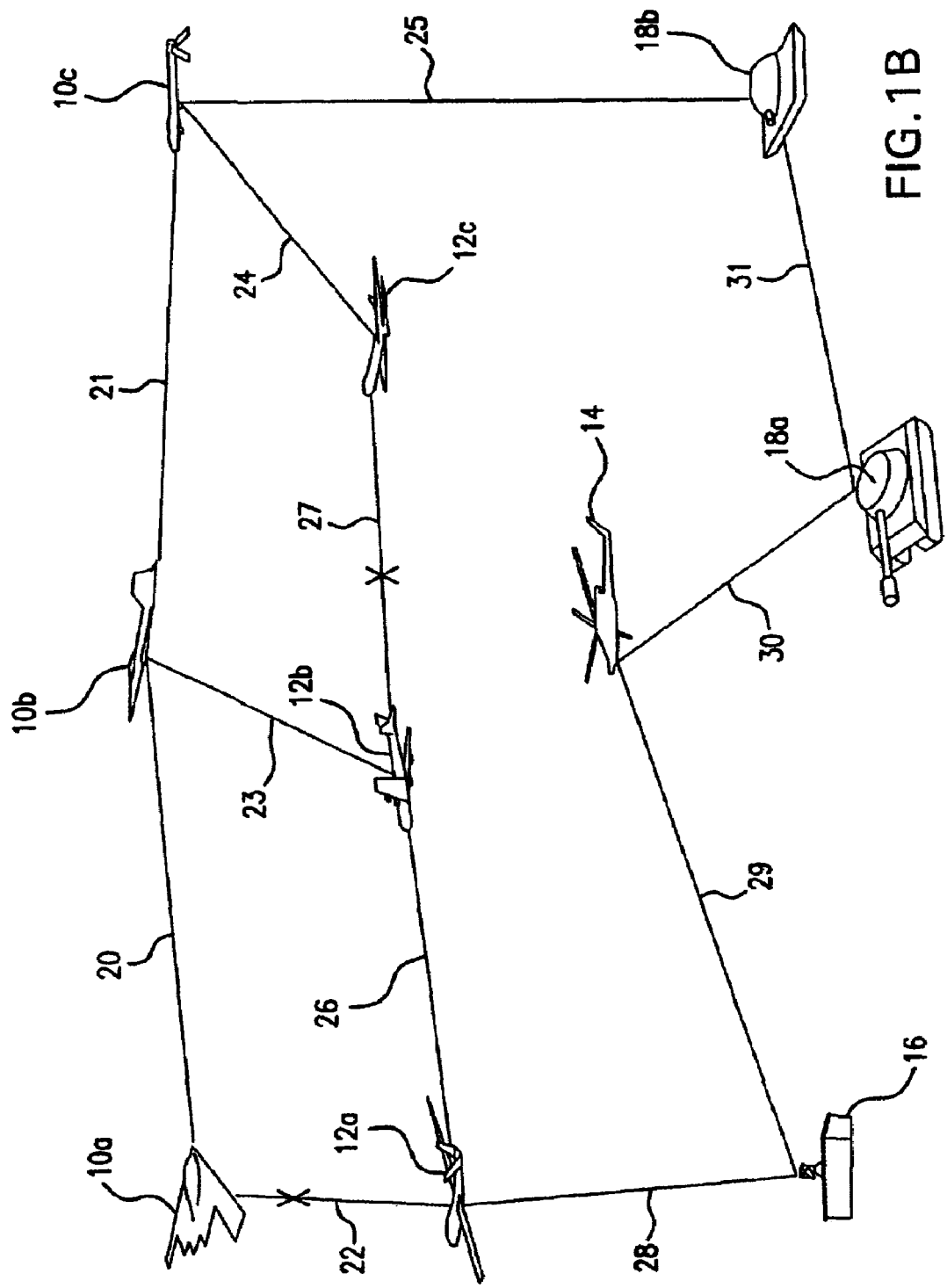

An interruption in network connectivity is illustrated in FIG. 1B, which portrays the same network as illustrated in FIG. 1A. However, in FIG. 1B, two communication links, i.e., link 22 and link 27, have been lost as indicated by the "X" drawn on the link. As previously discussed, the communication links may have been lost due to an obstruction such as by cloud cover or due to excessive attenuation from atmospheric aerosol or fog. It will now be shown that the topology of the network, via the re-assignment of the directed beams, can be physically changed to overcome a communications failure.

Figure 1C:
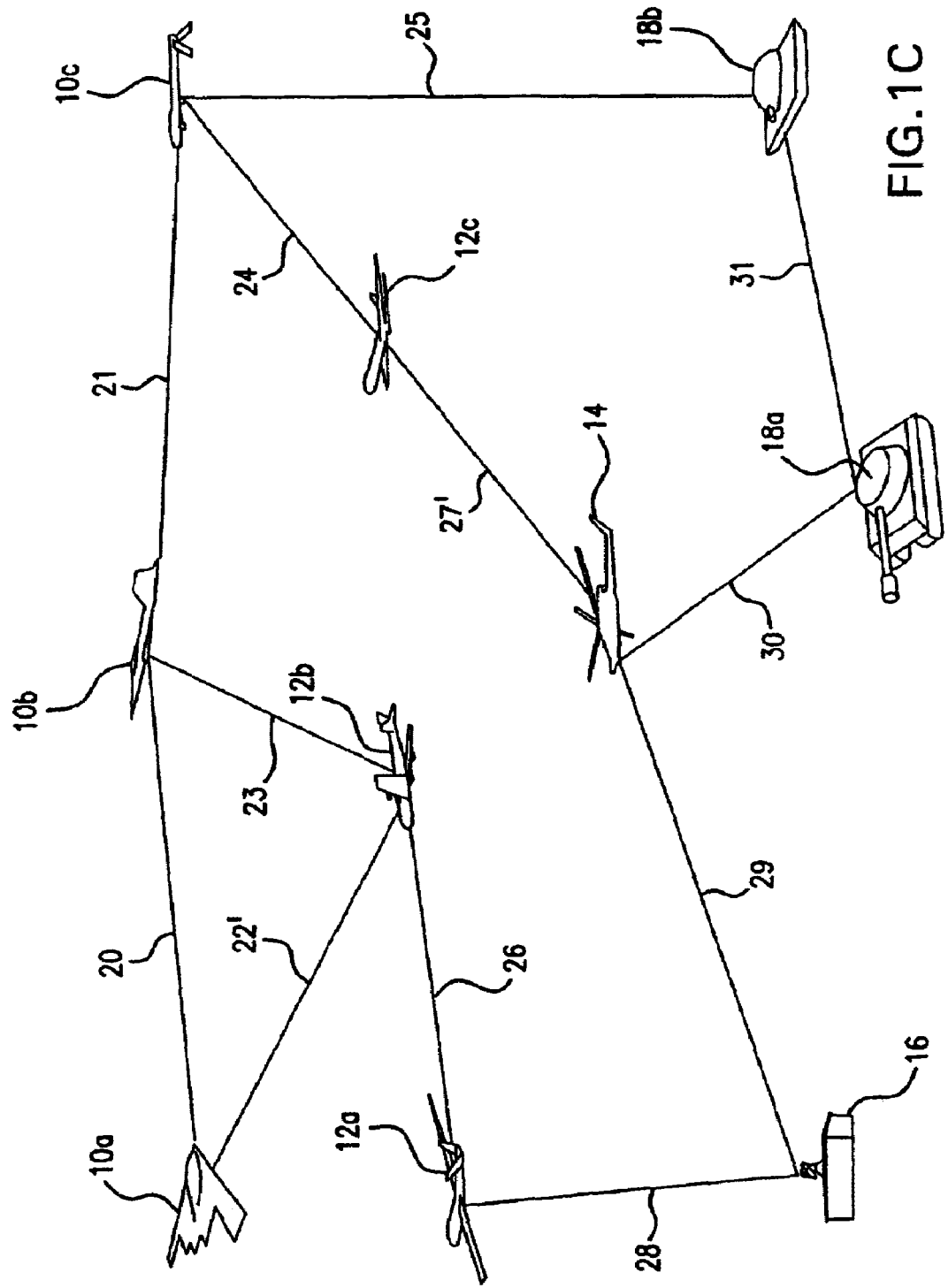

Referring to FIG. 1C, there is shown an alternative network topology to re-route network traffic around the failed communication links. As is shown in FIG. 1C, high altitude aircraft 10a has re-directed beam 22 from mid-altitude aircraft 12a to mid-altitude aircraft 12b and has established a new communication link 22' therebetween. Similarly, mid-altitude aircraft 12c has re-assigned the directed beam forming communication link 27 from mid-altitude aircraft 12b to helicopter 14, thereby forming new communication link 27' therebetween.

The reconfiguration of the network topology as illustrated in FIG. 1C maintains the network integrity through a number of different mechanisms. First, each of the nodes in the communications network is maintained at an order of at least 2 and as such, a closed signal path to every node in the network is maintained. Thus, every node in the reconfigured network may communicate with every other node in the network either directly or by traversing intervening nodes in the network. The change in network topology occurs very rapidly and, in the case where information is buffered at each node in the network, reconfiguring the topology may occur with only a minimal interruption in data flow.

Figure 1D:
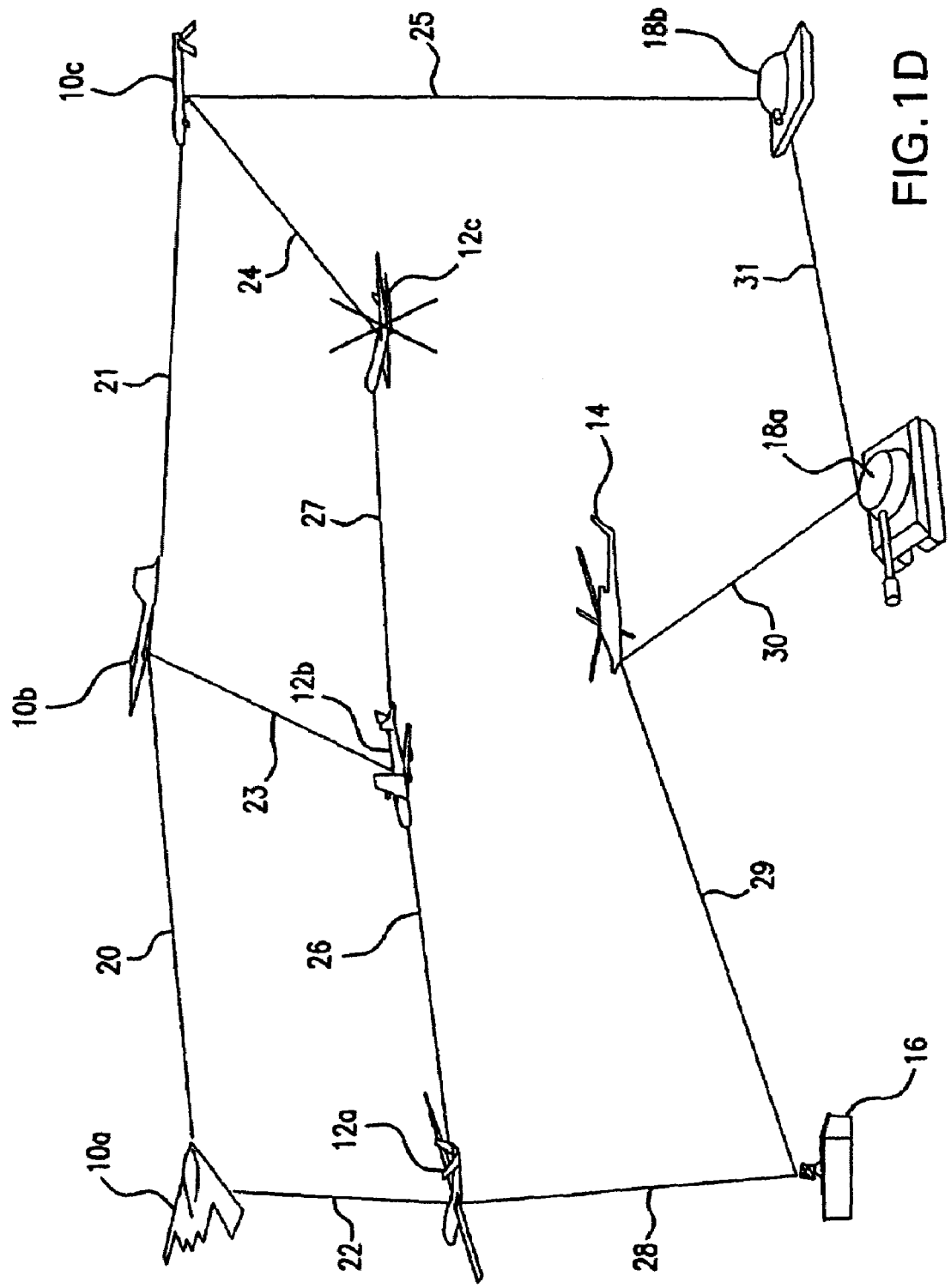

Consider now the network configuration of FIG. 1D, which has the same initial topology as that of FIG. 1A. In this case, the mid-altitude aircraft 12c departs from the field of battle as indicated by the "X" drawn therethrough. The present invention overcomes the loss of the network node by once again reconfiguring the network topology to route communications around the dropped node.

Figure 1E:
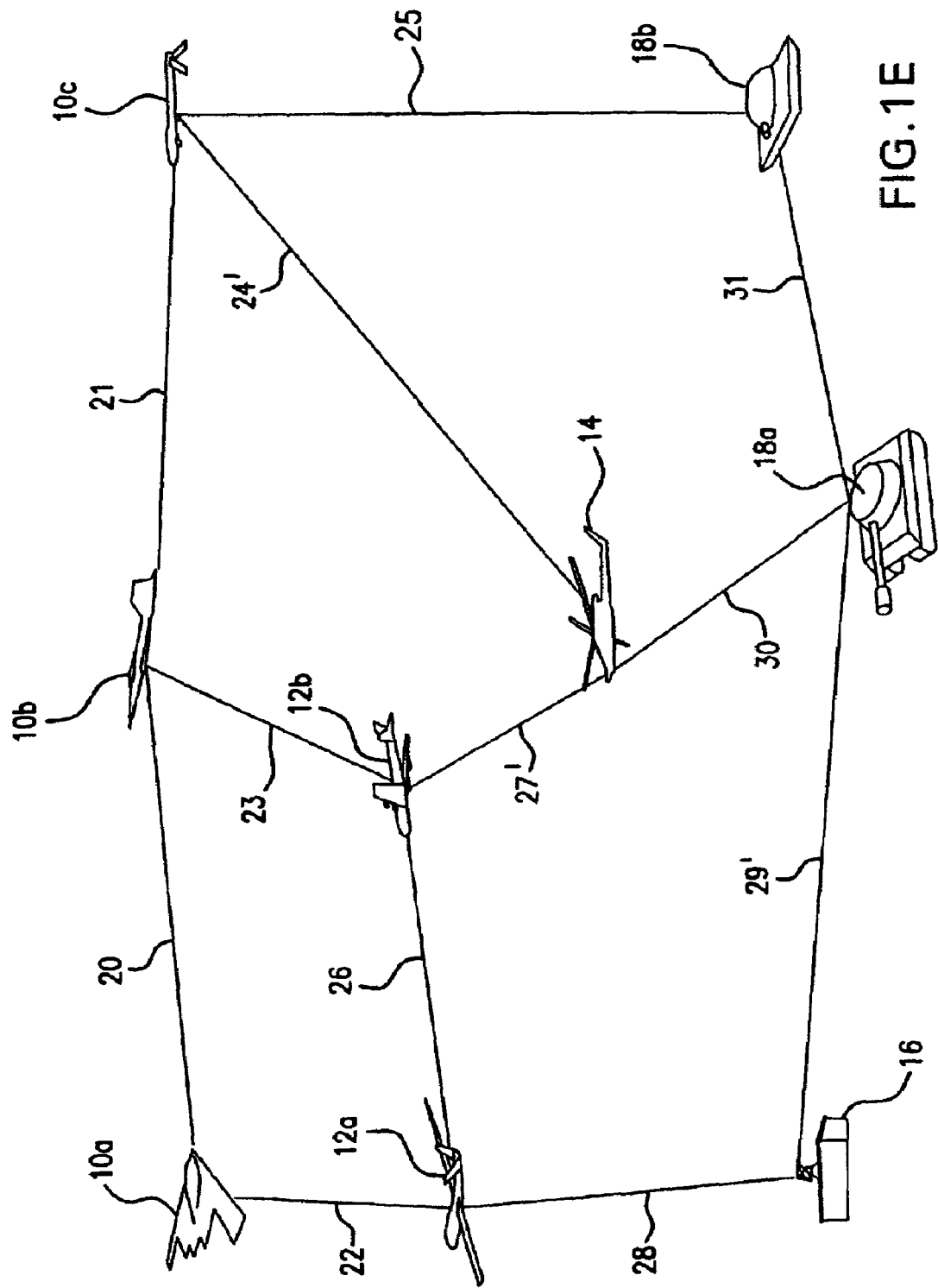

As is shown in FIG. 1E, several nodes are tasked with re-assigning one of their directed beams to compensate for the missing aircraft 12c. High altitude aircraft 10c has re-directed the directed beam on which communication link 24 was formed from mid-altitude aircraft 12c to helicopter 14. A new communication link 24' is established on the newly directed beam. Similarly, mid-altitude aircraft 12b has re-directed the directed beam on which communication link 27 was formed to helicopter 14, simultaneously forming new communication link 27' thereon. Additionally, stationary facility 16 has re-directed the beam on which communication link 29 was originally formed from helicopter 14 to ground-based vehicle 18a. A new communication link 29' is formed on the newly directed beam.

Once again, the new network topology of FIG. 1E ensures that each node is maintained at an order of at least 2 to accommodate a closed signal path from each node to every other node in the communication network. Further, each node receives link information periodically from other nodes in the network, so that communication links are not duplicated.

The foregoing Figures, FIGS. 1A–1E, and the associated discussions thereof, illustrate, in general, some of the important features of the present invention. Details are now provided to specific implementations of the invention. First, examples of typical hardware for providing a platform for the invention will be discussed, followed by particular algorithms for its implementation.

Figure 2:
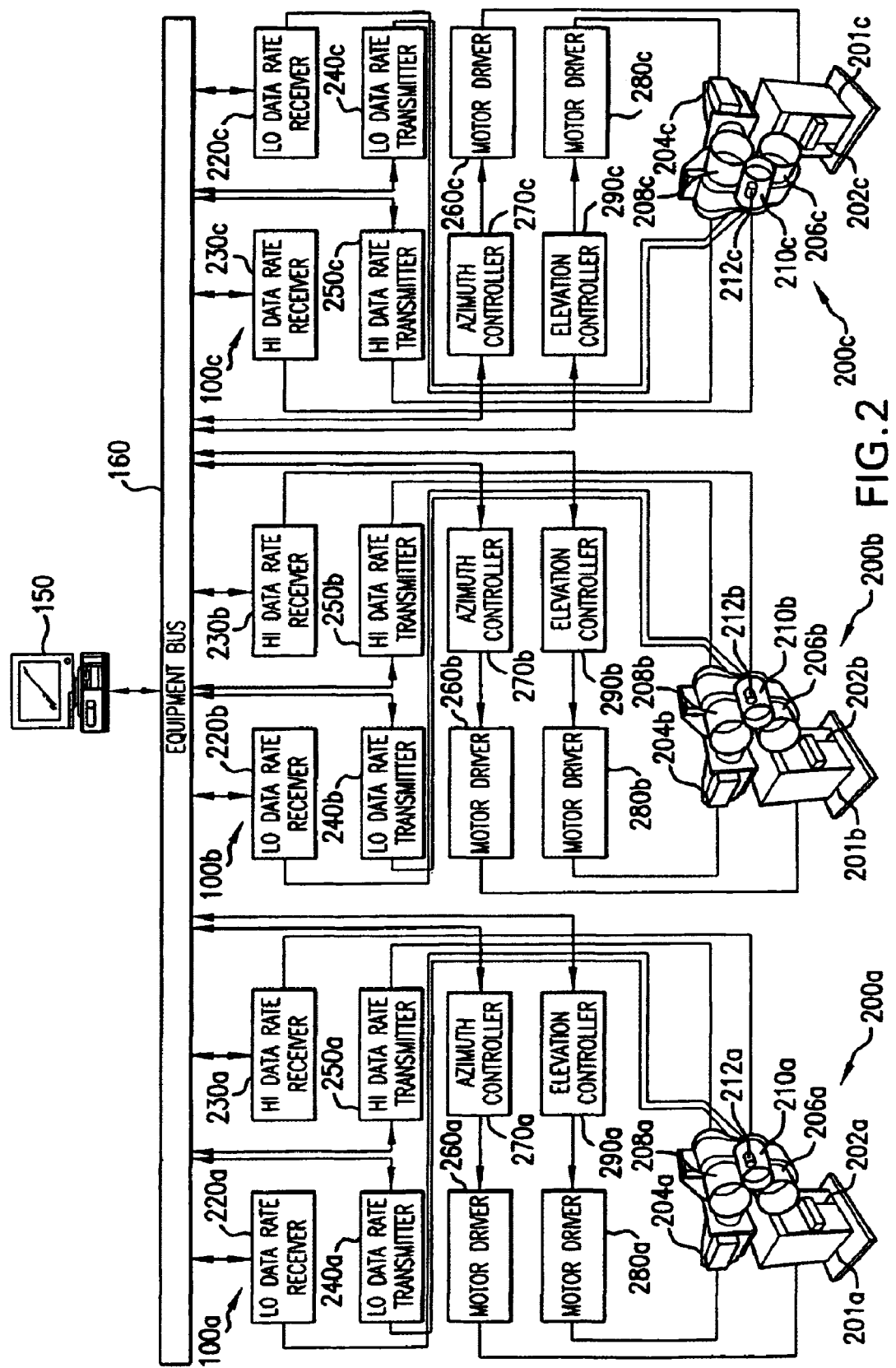
FIG. 2 is a block diagram of exemplary hardware deployed at each node in the network of the present invention.

In an exemplary embodiment of the present invention, the individual nodes of the communication network are connected via optical wireless links (OWLs) using a narrow beam of laser light to convey the information signal between nodes. FIG. 2 illustrates the equipment associated with a single node in the optical wireless network. In the embodiment of the Figure, each node has installed thereat three transceiver channels 100a, 100b, 100c, each of which is equipped with a corresponding transceiver 200a, 200b, or 200c. Each node is furnished with one transceiver for each OWL associated with the node. Given that the node of FIG. 2 is outfitted with three transceivers, the node is capable of being assigned an order of 3. However, the node may only be required to maintain an order of 2, in which case the third transceiver may be maintained in a ready state or may be used for system probing, as will be discussed in following paragraphs. As all three transceivers and the circuitry associated therewith are identical, the transceiver in general and associated hardware are discussed without distinguishing between channels. When applicable, the following discussion refers to transceiver 200 (or other system component) and it is to be understood that the discussion applies to transceivers 200a, 200b, and 200c.

Transceiver 200 of FIG. 2 includes a motorized pedestal 201 on which is mounted a high data rate receiving aperture 206, a high data rate transmitting aperture 208, a low data rate receiving aperture 210, and a low data rate transmitting device 212. In the optical wireless network embodiment of the present invention, the high data rate transmitting aperture 208 includes a laser and associated optics for transmitting a directed laser beam on which an information signal is conveyed and the high data rate receiving aperture 206 includes an optical-to-electrical (O/E) converter, such as a photodiode, and associated optics, for receiving the directed laser beam of an opposing transmitter. The O/E converter converts the information signal from an optical signal into an electrical signal to be processed by an electronic computer or similar device.

The low data rate receiving aperture 210 of transceiver 200 may include an O/E converter, in the case where the associated low date rate channel (i.e., low data rate receiving aperture 210, low data rate transmitting device 212 and associated circuitry as opposed to the high data rate channel which includes high data rate receiving aperture 206, high data rate transmitting aperture 208 and associated circuitry) is an optical channel or the low data rate receiving aperture 210 may include an RF antenna for when the low data rate channel is a radio frequency channel.

Figure 3:
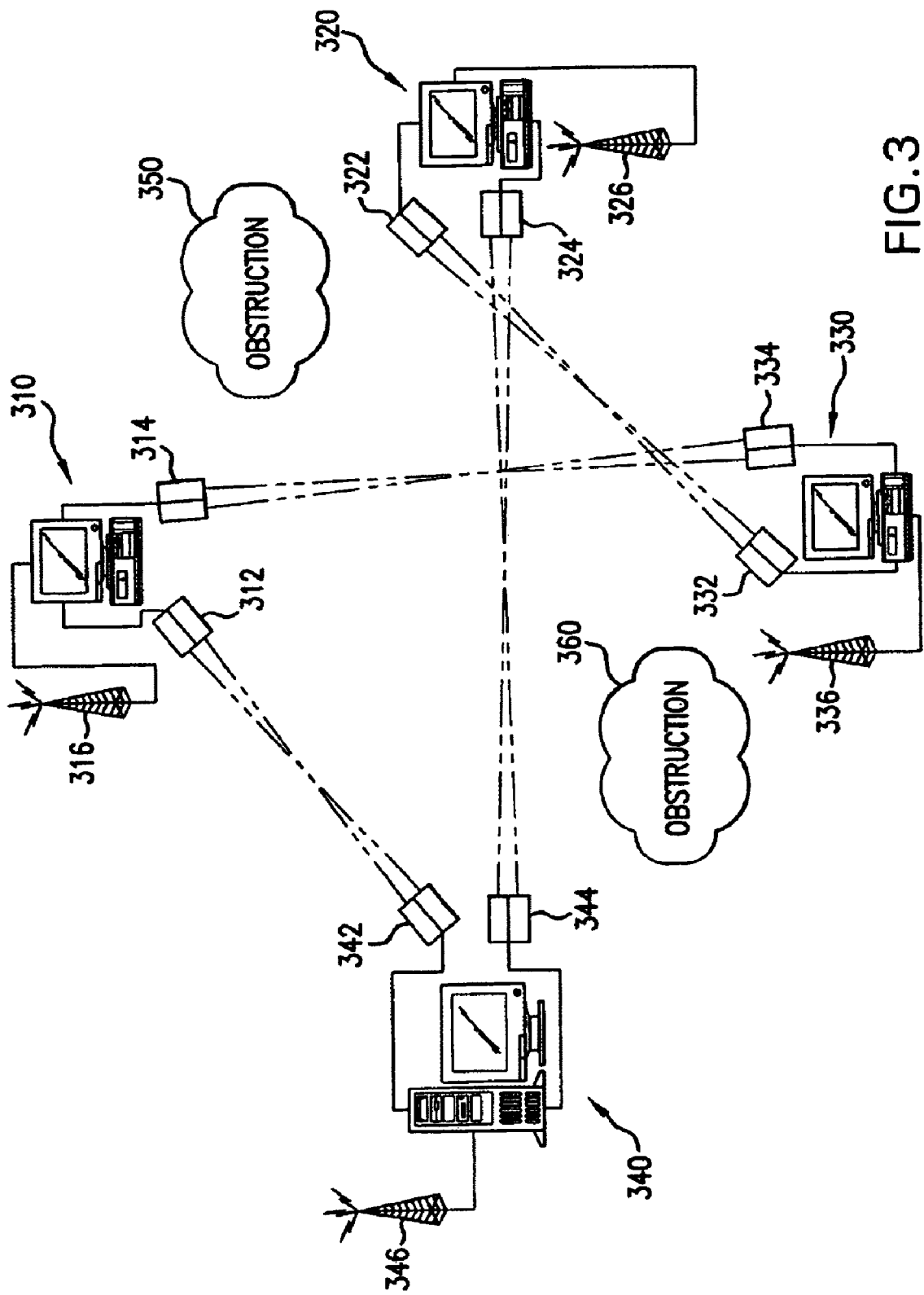
FIG. 3 is a network diagram of a simple network in accordance with the present invention.

The low data rate transmitting device 212, in particular embodiments of the present invention, is a broadcast transmitting apparatus such as an omni-directional light emitting device or a radio frequency transmit antenna. In other embodiments, however, the low data rate transmitter transmitting device 212 may be another directed beam associated with the low data rate receiving aperture 210. In the case where the low data rate channel is a broadcast channel, a single receiving aperture and transmitting device may be associated with the entire node as opposed to being duplicated at each transceiver. Such a configuration reduces the complexity of the system by eliminating duplicate hardware from each transceiving channel. Additionally, the low data rate transceiver may be associated with a single monostatic aperture as opposed to a bi-static configuration where separate receiving and transmitting apertures are maintained. The monostatic configuration is especially useful when the low data rate channel is an RF broadcast channel. Then, a single RF antenna may be placed at each node for receiving and transmitting secondary data (as discussed below) over the low data rate channel. Such a configuration is illustrated in FIG. 3.

The low data rate channel, in particular embodiments of the present invention, is used to carry secondary data between nodes and is alternatively referred to as the secondary data channel. Secondary data includes, but is not limited to, node position and link status data, as will be discussed in paragraphs that follow, or may be the primary (high data rate) network information signal conveyed at a lower transmission rate. The secondary data is primarily used for network maintenance functions, but may be relied upon for providing communication of primary network traffic, normally carried on the high data rate channel, if a catastrophic failure of the high data rate channels of the network occurs.

In the exemplary embodiment of FIG. 2, the high data rate transceiving apertures 206 and 208, as well as the low data rate transceiving apertures 210 and 212, are mounted on motorized pedestal 201. The motorized pedestal 201 orients the directed beam of the high data rate channel (and low data rate channel when the low data rate channel is not a broadcast channel) in the desired direction in order to establish a communication link with another node in the network. Thus, the three transceivers 200a, 200b, and 200c are independently steerable, each with respect to the other, and can be directed to connect the node to up to three other nodes in the network, forming associated communication links therewith. The independently steerable transceivers 200a, 200b, 200c allow the physical reconfiguration of the topology of the network.

Motorized pedestal 201 is equipped with an azimuth motor 202 for rotating the transceiver azimuthally in a desired direction and an elevation motor 204 for pointing the directed beam of the transceiver to a desired elevation. Each motor 202, 204 is electrically coupled to a corresponding motor driver 260, 280, respectively, which, in turn, are respectively coupled to azimuth controller 270 and elevation controller 290. Azimuth controller 270 and elevation controller 290 provide the electrical interface between the respective motor drivers 260, 280 and a system controller, which is discussed below.

High data rate transmitting aperture 208 is coupled to high data rate transmitter 250, which incorporates the necessary circuitry for transmitting an information signal over the OWL. This circuitry is well known in the art and includes, but is not limited to, laser driver circuitry, encoding circuitry, protocol conversion circuitry, and analog-to-digital and/or digital-to-analog conversion circuitry. Similarly, high data rate receiver 230 incorporates the necessary circuitry for receiving an information signal over an optical wireless link and includes decoders, protocol conversion circuitry, analog-to-digital and/or digital-to-analog circuitry, etc.

Low data rate receiver 220 and low data rate transmitter 240 incorporate the circuitry necessary for communicating secondary data from each node of the communication network to another node in the communication network. As with the high data rate channel, the low data rate receiver 220 and low data rate transmitter 240 include encoders, decoders, protocol conversion circuitry, analog-to-digital circuitry, digital-to-analog circuitry, etc., as is well known in the art. In the case where the low data rate channel is a broadcast channel, the low data rate receiver 220 and low data rate transmitter 240 incorporate circuitry for providing broadcast information over a broadcast link. When a single broadcast link is provided at each node at the network, as opposed to being duplicated at each transceiver of each node, only a single low data rate receiver 220 and low data rate transmitter 240 are required for the entire node.

The circuitry of each transceiver channel 100a, 100b, 100c is electrically coupled to a system controller through equipment bus 160. Equipment bus 160 is in turn electrically coupled to a user terminal 150 for providing access by a user to the communication network. In one embodiment of the present invention, the system controller is a process executed on the user terminal 150 and equipment bus 160 is a hardware bus within the enclosure of user terminal 150. Alternatively, the system controller may be a separate microprocessor (not shown) coupled to equipment bus 160 and the system controller and equipment bus 160 may be housed separately from user terminal 150.

The network node configuration of FIG. 2 is equipped with three independently steerable transceivers 200a, 200b, 200c and, as such, may be a node of up to order 3. Although the node is equipped with three transceivers, it is only required that the node be bi-connected, and not necessarily tri-connected. Thus, it is only required that two of the transceivers be involved in providing a communication link via a directed beam at a given instant in time. When the node is of order 2 and has a third transceiver installed and available, the third transceiver may be used for system probing to determine the location and link status of other nodes, until the third transceiver is required for establishing a communication link to another node in the network.

Whereas the pointing mechanism of each transceiver 200a, 200b, 200c in the configuration of FIG. 2 is a motorized pedestal 201a, 201b, 201c, respectively, other pointing mechanisms are within the intended scope of the present invention. The directed beam of each transceiver channel 100a, 100b, 100c may be pointed through a pair of galvanometrically-controlled mirrors in the path of the directed beam to control the direction thereof. Any means for independently steering a directed beam of an optical wireless link for the purposes of physically reconfiguring the topology of the communication network in response to varying link conditions are within the scope of the present invention.

In addition to the motorized pedestal 201a, 201b, 201c for pointing the directed beam, each of which provide at least a coarse beam pointing mechanism, each transceiver may also include a fine beam pointing or tracking mechanism to assist in the fine tracking of the location of other nodes in the network. The fine beam pointing mechanism may be a function of the motorized pedestal 201 such as by the use of high resolution stepping motors for azimuth motor 202 and elevation motor 204, but may be a separate apparatus.

In alternative embodiments of the instant invention, the redirection of the laser beam in the optical wireless link involves a movable mirror, such as the galvanometrically controlled mirror discussed above, a microelectromechanical system (MEMS) mirror, a piezoelectric scanner, an acousto-optic beam deflector, or an electro-optic beam deflector. Whereas these devices may be used as the primary pointing mechanism, their range of beam deflection may be limited, in which case the devices may be used as a fine beam pointing mechanism controlled separately from the motorized pedestal 201. Alternatively, a laser array, for example, a vertical cavity surface emitting laser (VCSEL) can be used in the focal plane of the high data rate transmitter optics to provide redirection of the output beam of the transceiver. The VCSEL array, when mounted in a transceiver on a motorized pedestal 201, may be used to provide fine or high resolution beam deflection for node tracking of other nodes in the network. The tracking of nodes in the network of the present invention will be discussed in paragraphs that follow.

A block diagram of a communications network in accordance with the present invention is illustrated in FIG. 3. This simple network illustrates several key features of an optical wireless network with adjustable topologies. The network of FIG. 3 interconnects four nodes 310, 320, 330, and 340. Each node is of order 2 which, as discussed, indicates that two of the nodes high data rate transceivers are deployed to form a respective communication link with another node by pointing the directed beam thereto. Additionally, each node 310, 320, 330, and 340 has incorporated therewith a monostatic radio frequency broadcast transceiver indicated at 316, 326, 336, and 340, respectively. The RF communication link conveys secondary channel data between the nodes 310, 320, 330, and 340.

Particular embodiments of the invention may have an RF back-up to the optical link to handle rare occasions of extreme optical obscuration thereby allowing primary network data to be conveyed over the secondary data channel at a reduced transmission rate. Changing transmission modes in an optimum manner from a directed beam optical link to an RF broadcast link and back are advantageous features of the current invention. The topology control algorithm, to be discussed below, continuously monitors the communication link quality by examining received power at the node, bit error rate (BER) at the node, or some other performance metric, and makes a decision to switch from optical to radio frequency when the communication link quality fails to meet a link quality parameter. The same algorithm monitors optical link states thereafter to determine if favorable conditions allowing the optical connection return. The link then switches from the RF broadcast link to the optical directed beam communication link.

The network topology of FIG. 3 further illustrates the re-assignment of the directed beams from each node to maintain a closed signal path for an information signal in the presence of obstructions or obscurations. As shown in the FIG. 3, node 310 has a communication link established with node 340 through transceivers 312 and 342, respectively; node 340 has a communication link established with node 320 via the directed beams of transceivers 344 and 324, respectively; node 320 has a communication link established with node 330 through the directed beams of transceivers 322 and 332, respectively; and node 330 is linked with node 310 via the directed beams of transceivers 334 and 314, respectively. This topology prescribes a closed signal path for the network, i.e., each of the nodes 310, 320, 330, and 340 can communicate with any other node in the network either through a direct communication link, such as that of directed beams associated with transceivers 344 and 324, or through an indirect link, such as the directed beam of transceiver 314 being linked with transceiver 334 and the information signal carried thereon traversing node 330 and being carried to node 320 via the directed beam of transceivers 332 and 322.

Having now discussed various hardware configurations for carrying out the method of topology control in an optical wireless network, the methodology of such will now be detailed with reference to the previously described hardware.

The topology control algorithm of the present invention utilizes information about the link state of the network nodes with respect to physical reachability of the node as well as the throughput thereof. When taken in view of the well known International Standards Organization's Open System Interconnect (ISO/OSI) model of a communication network, the link state of a particular node is determined at the physical layer and the network layer. The topology control algorithm modifies the node's physical layer implementation through the reassignment of directed beams from one node to another node, by fine tracking of the directed beams to an assigned node and/or by adjusting the transmitted power density at the node (e.g., by altering the transmitted beam divergence). The effect of data throughput resulting from the physical layer modification can be monitored on the network layer and new topologies may be selected to maximize the throughput. This arrangement allows autonomous backbone reconfiguration in concert with the network's routing facilities for physically manipulating the network topology to optimize data throughput.

It is desirable for a communication network to be "multiple connected" for the purposes of assured and reliable communication. Each node in the network should be at least bi-connected which provides robust performance and enhances the quality of service (QoS) in the network. If this bi-connectedness is lost, the network becomes partitioned and can only be reconstituted by actively changing the topology, such as in the manner discussed above.

When the laser beam of a first transceiver must be re-directed to a new node, it may be necessary to discover the location of the new node. In one embodiment, nodes broadcast their location with an RF wireless signal over the secondary data channel at lower data rates than are possible with the optical wireless connections. This information about node location could involve the use of the global positioning satellite (GPS) information broadcast from each node. In other embodiments, nodes must discover each other with limited or no information about where such other nodes are located. Under good atmospheric visibility conditions, this can be done with the aid of passive or active retroreflectors placed at each node, which will provide a return signal to a transmitter that is looking to establish a communication link. Alternatively, the location of each node may be transmitted over a directed beam of the low data rate channel or may be ascertained from an optical beacon carrying location information over an optical broadcast link to the receiving aperture of another node.

Scanning for the location of network nodes can be manual, automatic, or both. Manual scanning involves rough alignment of a link followed by automatic fine seeking or tracking, as by the fine beam positioning devices discussed hereinabove. Automatic link establishment involves raster scanning of a transmitted beam over a selected solid angle and recording the position within the raster scan at which signal returns are detected. In good to fair visibility conditions, this may involve the aforementioned retroreflectors, but under obscure conditions, the two-way transmission of light energy that would be required for retroreflector operation would ultimately fail. In such a case, a special duplex, mutual acquisition process of two transceivers is required. In this scheme, a first transceiver makes a raster scan during which it is transmitting scan data such as a code word indicating the node location, which is continually updated during the scan. A second transceiver, on detecting the signal, stores the code word and then retransmits it along with its own location code word while performing its own raster scan. The receiving aperture of the first transceiver, in this way, receives a signal that indicates which way to point the associated transceiver in order to be directed at the receiving aperture at the opposing node. The transmitter of the first transceiver then signals the second transceiver to direct its receiving aperture in the direction indicated by the received code word. Thus, the link is "roughly" established. Fine tracking and locking is then initiated, where, for example, each transmitter is dithered in a conical scan and the variations of the received signal allows the determination of which way to precisely point each transmitter aperture at the appropriate receiving aperture of the opposing node. The dither is carried out at a frequency non-commensurate with the data rate on the high data rate transceiver channel so that scan related information can be easily filtered from data. By carrying out a conical scan, information about relative drift between opposing transmitting and receiving apertures can be determined from the derivative of the tracking information, which allows an active control scheme to re-direct the transmitted beam accurately at the opposing receiving aperture. Alternatively, the received signal at the receiving transceiver can be partially directed to a position-sensitive detector, CCD array, or CMOS array. These detectors provide direct information about the relative motion of the transmitted beam at the opposing receiving aperture and allow automatic alignment.

In another embodiment of the invention, the acquisition and tracking of a network node is initiated when the first transceiver conducts a raster scan in attempt to locate a second transceiver at a remote node. During the raster scan, the first transceiver periodically transmits its pointing direction as taken with reference to its location in space. As the first transceiver scans over a region occupied by a second transceiver at a remote node, the second transceiver will eventually intercept the position signal of the first transceiver and will steer its transmitting and receiving apertures toward the location of the first transceiver as indicated by the transmitted pointing direction thereof. While it begins to track the first transceiver through its pointing signal, the second transceiver identifies its own pointing direction to the first transceiver as well as re-transmitting to the first transceiver the received pointing direction thereof. This provides the first transceiver with not only the location of the second transceiver, but also informs the first transceiver as to which of its transmitted pointing directions were actually received by the second transceiver. The first transceiver will respond to the received pointing signal of the second transceiver by adjusting its own pointing direction to align therewith and transmits its new pointing direction. The two transceivers iteratively redirect their respective beams towards the opposing transceiver responsive to the received pointing directions thereof and transmit their respective new pointing directions until the beams of the two transceivers are aligned.

The network topology is continuously monitored using an optical probing technique which monitors and discovers potential neighbors by determining the link cost or characteristic level (e.g., receive power, BER, fade, obscuration) against established network topology parameters. The predetermined network topology parameters control the selection of nodes with which to connect in order to optimize the network topology. The network topology parameters may include distance to the nearest node whereby nodes with which to connect are selected according to proximity to a host node. However, the network topology parameters may be more complicated to force a topology that maximizes a network performance metric such as data throughput.

For the purposes of monitoring the communication links of the network, one embodiment uses a measurement of the receiver power to determine the effects of atmospheric obscuration and receiver optics thereon. The received power at a given node, $P_R$, is characterized by:

$$P_R = P_T e^{-\alpha L} \frac{2A}{\pi \theta^2 L^2} \quad (1)$$

where:
A is the area of the receiver aperture;
$P_T$ is the transmitted power at the opposing node;
θ is the beam divergence half angle;
L is the distance between the transmitting transceiver and a receiving transceivers; and
α is an attenuation constant for compensating for certain atmospheric conditions such as fog and snow.

As is shown by the equation above, the received power may be increased by increasing the transmitter power at the opposing node, the receiver area, or by reducing the beam divergence of the transmitter beam. Implementation of altering the divergence of the transmitter beam requires an effective beam pointing and tracking mechanism in that a narrower beam must be more precisely pointed in order for its target to be completely illuminated.

In response to changes in network load or link/switch failures, topology control of the present invention enables links to be re-formed in order to meet objectives such as bi-connectivity, minimal power requirements, minimal network congestion, and minimal number of switches. Unlike packet switched networks of the prior art, the present invention considers multiple link and switch states in the topology reconfiguration process. This reconfiguration is very dynamic and can occur in less than one second.

The method of the present invention involves low complexity algorithms and heuristics that include: discovery of costs matrices (e.g., power, signal strength, fade, obscuration) using optical signaling; distribution of node information to all other nodes; and execution of heuristic algorithms to choose the best possible topology based on such characteristics as transmit power, link fades, signal interference ratio, etc.

In one embodiment of the instant invention, each node in the network exchanges link state information, such as received power and current beam divergence with the other nodes. The received power provides an indirect measure of the likely BER. A predetermined communication protocol is utilized that allows the nodes to exchange neighboring BER values so that the nodes are able to determine an optimal network topology using the BER as the controlling network topology parameter.

The adjustment or reconfiguration options available to a given node are based on the following questions: (1) can changing the beam divergence, bandwidth/capacity or transmitter power compensate for a degradation of QoS (e.g., an increased value of BER) on the communication link? (2) If not, how should the network topology be reconfigured in order to improve the QoS? The first decision corresponds to changing operational variables at each node in the network. For the second decision, the network topology parameters establishes a limit on the performance metric, such as the overall end-to-end traffic delay, so that the new topology is reconfigured when the optimal end-to-end delay exceeds a threshold value.

For a network of N nodes, there are a possible $(N-1)!/2$ ring topologies from which to choose. Complicating matters is that the selection of a network topology must occur in real time, as the data transmission rate of the optical network is typically several hundred Mb/s. The algorithm of the present invention implements a heuristic methodology for selecting a network topology in a timely manner by prescribing a set of network topology parameters and associated performance metrics and choosing the topology which optimizes the performance metrics in accordance with the network topology parameters.

In one embodiment of the invention, the configuration, or reconfiguration, of the network topology is achieved using well-known spanning-tree algorithms and associated heuristics that are based on predetermined network topology and link quality parameters. For example, in a ring network with two transceivers per node, a link quality parameter may be the BER of the communication link and the predetermined BER threshold may be $10^{-9}$. That is to say that when the BER of one or more of the communication links becomes greater than $10^{-9}$, the network topology must be reconfigured.

In one embodiment of the invention, the heuristic method used to configure the ring network include the following steps:

(1) communication links or connections between nodes are chosen, iteratively, on the basis of a network topology parameter, such as BER or other least-cost criteria, until the entire network is connected;

(2) if a given connection requires an unassigned transceiver at a node, and all transceivers are assigned to other nodes, then a communication link must be established with a node with the next lowest cost to the network; and (3) determine the link quality of all of the communication links against a link quality parameter to determine if the network is configured in accordance therewith and reconfigure the network if necessary.

The steps of the heuristic method are repeated until the network is configured.

In certain embodiments of the present invention, network monitoring hardware and software evaluates the performance of each link by monitoring the BER, received power or signal-to-noise ratio of the link. The algorithm of the present invention determines how long a link has been in a failed state before making a decision about topology control, because the failure may be a short-lived one, produced for example by link fading.

For obscuration penetration on line-of-sight optical links, the traditional approach has involved power control, with power being increased as obscuration increases. The present invention implements a new scheme referred to as "dynamic zoom" in which the angular divergence of the transmitted beam is actively controlled to increase the intensity, or power density, reaching the opposing receiving aperture. This scheme does not require total transmitter power control and provides a large beam divergence under conditions of good visibility, which reduces tracking and locking requirements. When obscuration increases, the beam divergence is reduced to maintain received total power. This approach is power efficient as received power scales as $1/\theta^2$, whereas direct power control only scales linearly with power.

Dynamic zoom is accomplished by moving the transmitter laser axially inside the transmitter optics, which changes the emerging beam divergence. With the transmitter laser at the focal point of the output optics, the beam divergence is minimized and will have a value $$\theta = \frac{\lambda}{\pi w_0}, \quad (2)$$

where $w_0$ is the spot size of the output Gaussian beam, whose beam is located at the exit aperture of the transmitter. Moving the transmitter laser from the focal point causes the beam divergence to depart from this minimum value.

Figure 4:
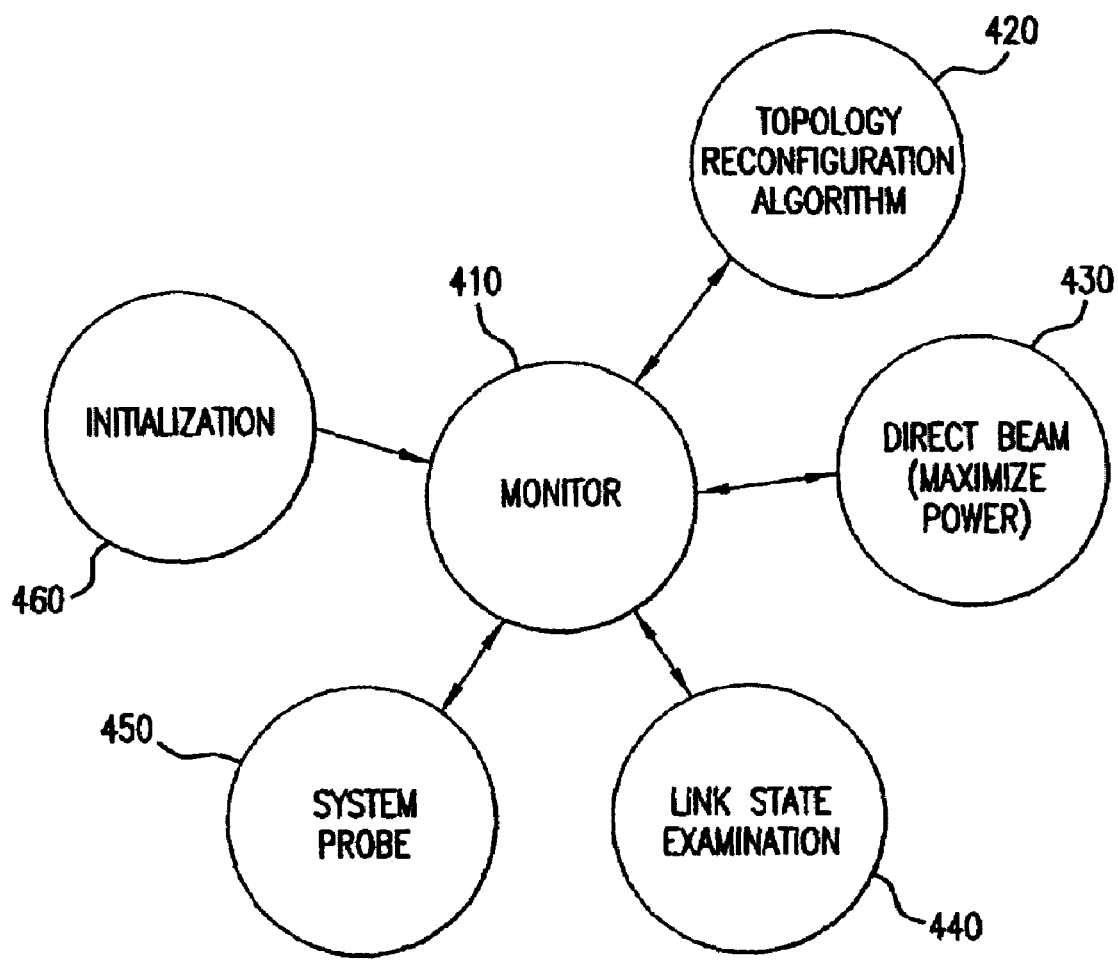
FIG. 4 is a state diagram depicting the interaction of the various processes of the method of the present invention.

Referring to FIG. 4, there is shown a state diagram demonstrating the interrelation of processes of the present invention. In the algorithm of the present invention, each node makes decisions based on its local information. The executed processes shown in FIG. 4 will now be explained in more detail.

In initialization process 460, a position table containing spatial coordinates (e.g., x, y, z) for each node and a link state table containing information about the availability of all possible links are loaded and maintained at each node. Each node determines its connectivity to other nodes based on this local information. This process will also initialize various control flags, timers, and hardware ports for controlling the directed beam pointing mechanism and receiving a protocol socket (i.e., the "listening port").

In the monitor state 410, each node conducts communications in a normal manner while simultaneously monitoring a link quality parameter such as the BER of the incoming information signal. If the communication quality of the communication link is found to be outside the limits of the link quality parameter, the node state changes to one of the other states.

In the topology reconfiguration process 420, the host node selects a network topology to maximize the network performance in accordance with the network topology parameters. In order to connect all the nodes and form a closed signal path for the chosen network topology, a clustering method, which successively connects or groups sets of nodes that are linked with each other, is deployed. The clustering algorithm produces a connection table containing the connections between nodes and will be discussed further below. After the cluster algorithm terminates, bi-connectivity between the opposing nodes of the established communication link is evaluated to ensure that the network forms a closed signal path. This determination is made by evaluating connections in the connection table and updating the table when reconfiguration is required.

In the beam direction process 430, the movement of the directed laser beam through the motorized pedestal 201 is initiated. After the cluster algorithm has generated the connection table, each node will try to reach its assigned destination nodes by redirecting its directed beam thereto.

The link state examination process 440 is executed after the network has been formed. Each node will transmit "hello" packets periodically to its assigned neighbor nodes. When an acknowledgement packet has not been received for a predetermined number of consecutive time periods, the host node will record the link failure in its link state table.

In the system probe process 450, each node will exchange its link state status to its reachable neighbors if the network has been segmented because of a broken link. The link state table at each node will then be updated based on this information and a new network topology will be formed based thereon.

Figure 5A:
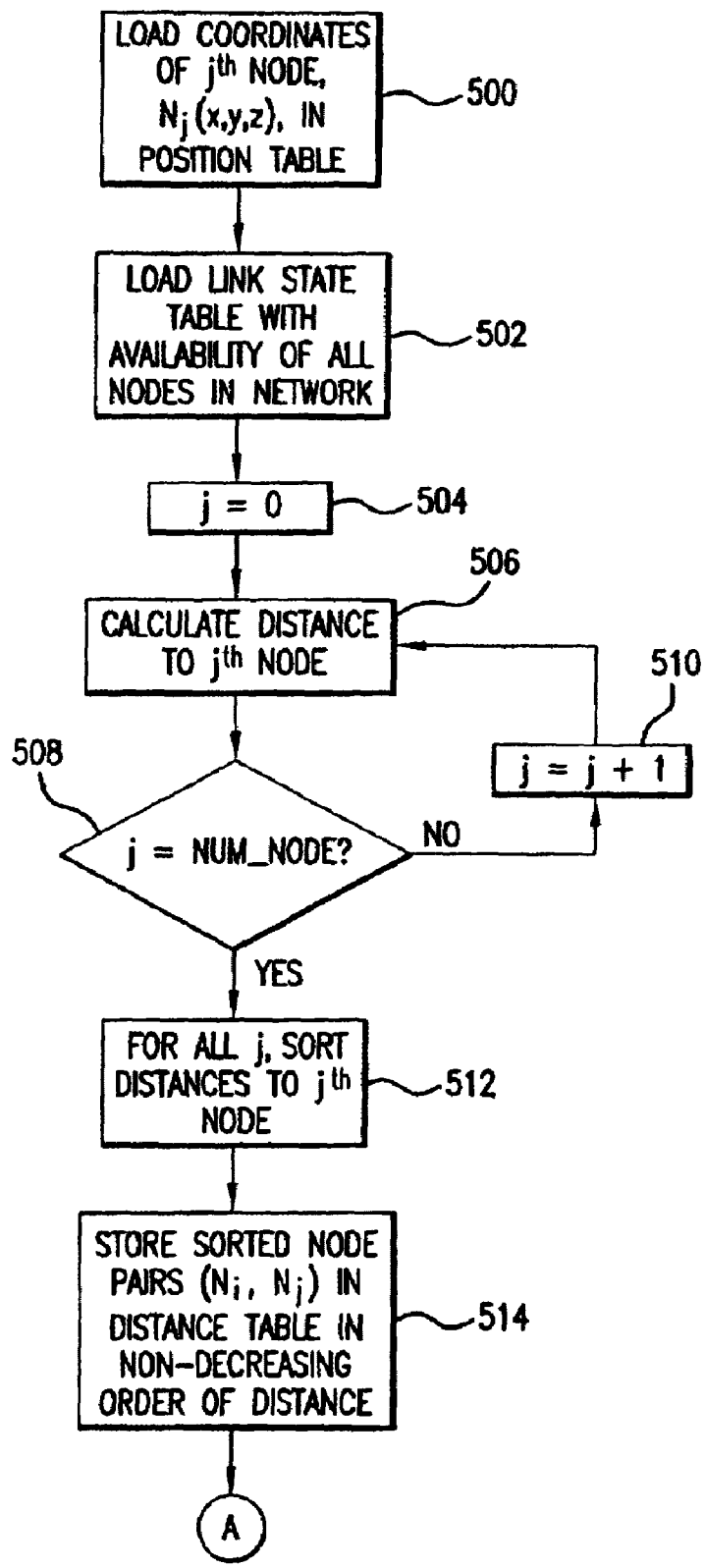
FIGS. 5A–5C is a flow chart of the topology reconfiguration algorithm of the present invention.
Figure 5B:
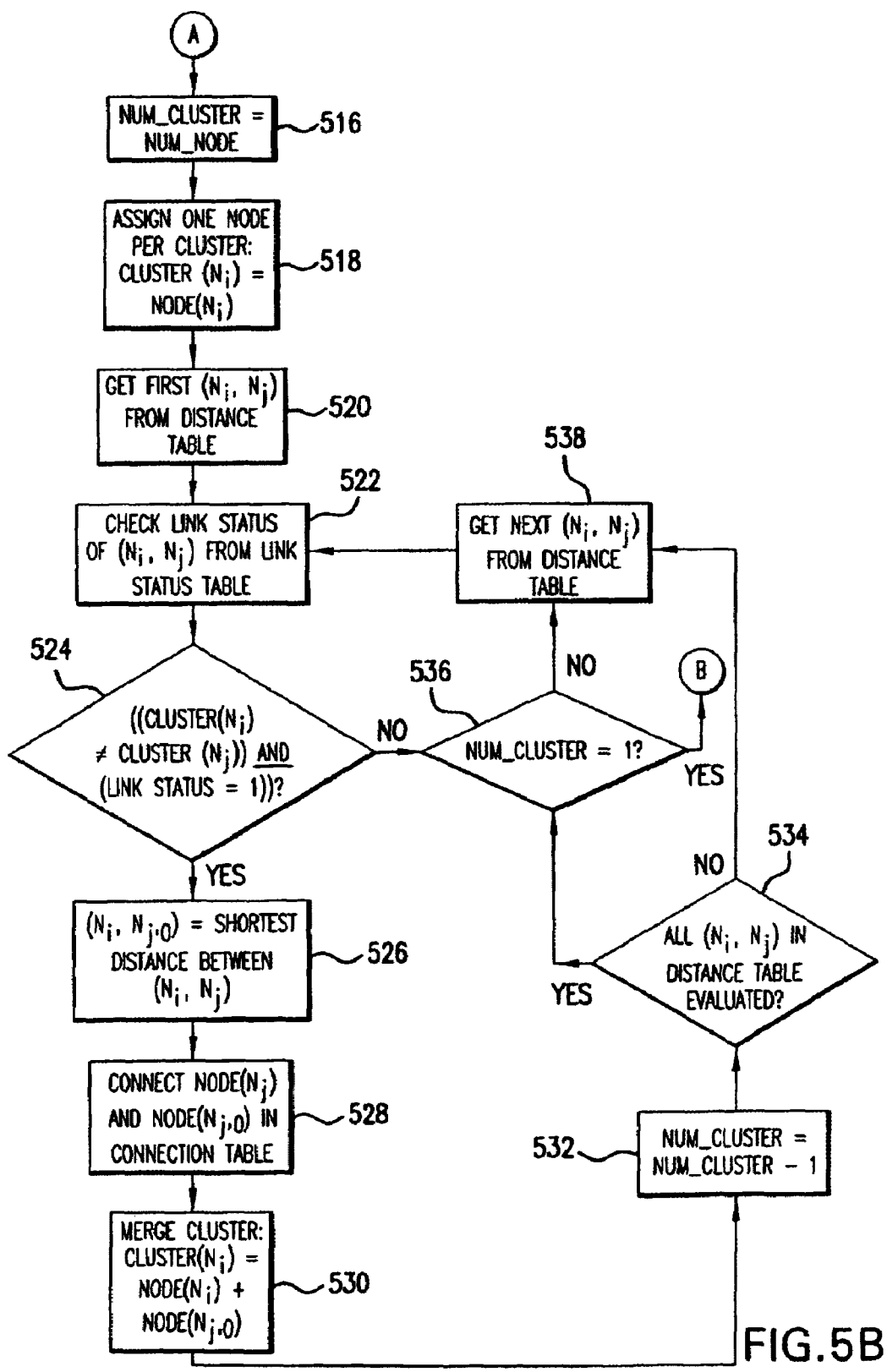
Figure 5C:
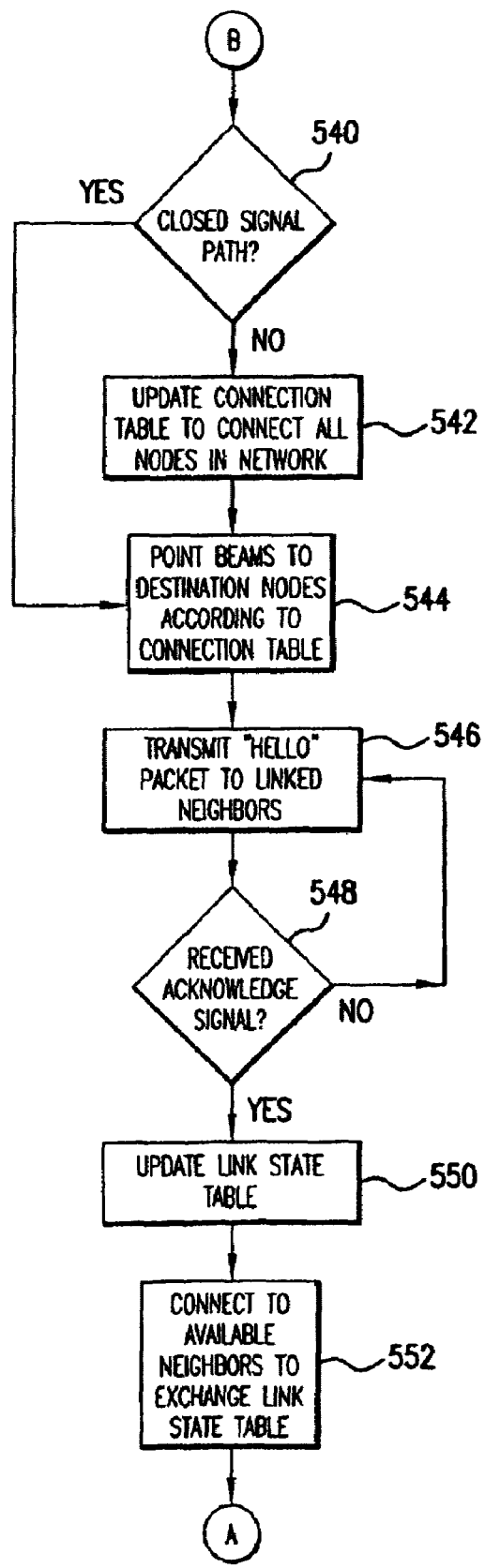

An exemplary algorithm for topology control is illustrated in the flow chart of FIGS. 5A–5C. In block 500, the coordinates of the jth network node of the communication network is recorded in the position table of the ith node or host node. In block 502, the link state table is loaded with the node availability of the nodes comprising the network. These two blocks are the basic implementation of the initialization process described above.

In blocks 504–510, the distances to the jth node are calculated and, in the exemplary embodiment, are used as the controlled network topology parameters. In blocks 512–514, the results of the distance calculations are sorted and stored in a distance table in non-decreasing order of distance.

Once the distances to the available nodes have been sorted, the clustering algorithm is initiated. Initially, each node will form its own cluster and the number of clusters is equal to the number of nodes, as indicated in blocks 516 and 518. The clustering algorithm will terminate if the number of clusters is equal to 1, which is the inquiry of decision block 536.

For every node pair in the distance table (block 520 and block 538), node $N_i$ determines if the neighboring nodes (e.g., node $N_j$) as determined from the distance table are in the same cluster. First, their link status is checked (second inquiry of decision block 524) to determine if the link status equals 1, in which case connectivity is possible, or if the link status is set to 0, where connectivity is not possible. The two nodes then compares information about their cluster (first inquiry of decision block 524). If the information is the same, the nodes belong to the same cluster. If all nodes belong to the same cluster, the number of clusters equals 1 and the algorithm terminates at decision block 536.

If the two nodes $N_i$ and $N_j$ are not members of the same cluster, they attempt to make a connection. The algorithm selects a node that has a minimum distance (with minimum distance as the controlling network topology parameter) from the host node with which to make a connection (block 526). The host node $N_i$ will then connect with the nearest node in a connection table. A new cluster is then formed by the newly established connection between the two nodes, as indicated in block 530. This also means the previous two clusters are merged into one new cluster. All the nodes inside the merged clusters should be aware of this change and update their cluster information. Another update is needed on the number of clusters when every merger occurs, which is decremented by 1 (block 532). The algorithm then selects the next node in the distance table to attempt to include it in the present cluster.

After the cluster algorithm terminates, bi-connectivity is evaluated to determine if a closed signal path is available amongst all the nodes of the network. In one embodiment of the present invention, bi-connectivity is evaluated between the opposing nodes of the communication link. If bi-connectivity is established between the opposing nodes, then a closed network has been formed. This determination is made from information contained in the connection table, which is updated when reconfiguration becomes necessary (block 542).

If there is no valid link status as determined by decision block 524, step 542 is directly executed. This implies that either the present node or set of nodes is isolated from the rest of the network. In other words, either the node cannot join the network or the set of nodes can only form a sub-network. Once the connection table has been established, the beam direction process, as described above, is executed, as indicated in block 544. As previously stated, once the network is formed, the link state examination process is executed as illustrated in blocks 546–550. The system probe process, as indicated by block 552, is executed in which the link state data of the nodes is exchanged. The process is repeated at block 516 which demonstrates the continuous loop nature of the monitor process.

Although the invention has been described herein in conjunction with specific embodiments thereof, many alternatives, modifications and variations will be apparent to those skilled in the art. The present invention is intended to embrace all such alternatives, modifications and variations that fall within the spirit and broad scope of the appended claims.

What is claimed is:

1. A method for dynamically configuring a topology of a communication network, the communication network including a plurality of nodes for providing access to the communication network, the method being performed at each node in the communication network and comprising the steps of:

(a) determining the locations of selected nodes for establishing communication therewith, said selected nodes being selected from the plurality of nodes in accordance with predetermined network topology parameters;

(b) providing a directed beam of electromagnetic radiation for each of said selected nodes for carrying a respective information signal thereon;

(c) directing said directed beam toward a corresponding one of said selected nodes to establish a respective communication link therewith;

(d) determining if said respective communication links established between the plurality of nodes in the communication network provide a closed signal path amongst the plurality of nodes;

(e) repeating the method at step (a) if said closed signal path is not found in step (d);

(f) evaluating communication quality of each of said communication links against a predetermined link quality parameter;

(g) redirecting said directed beam corresponding to a node for which said communication quality fails to meet said predetermined link quality parameter toward another of said plurality of nodes to establish a new communication link therewith; and (h) repeating the method at step (d).

2. The method for dynamically configuring a topology of a communication network as recited in claim 1, wherein said network topology parameters include distance to nearest node, said selected nodes being nearest ones of the plurality of nodes.

3. The method for dynamically configuring a topology of a communication network as recited in claim 2, wherein said distance to nearest node is determined by electromagnetic broadcast data.

4. The method for dynamically configuring a topology of a communication network as recited in claim 3, wherein said electromagnetic broadcast data is transmitted by a radio-frequency transmitter at each of the plurality of nodes.

5. The method for dynamically configuring a topology of a communication network as recited in claim 3, wherein said electromagnetic broadcast data is transmitted an optical transmitter at each of the plurality of nodes.

6. The method for dynamically configuring a topology of a communication network as recited in claim 1, wherein said directed beam provided for each selected node is independently steerable, each with respect to the other.

7. The method for dynamically configuring a topology of a communication network as recited in claim 1, wherein said electromagnetic radiation is of optical wavelength.

8. The method for dynamically configuring a topology of a communication network as recited in claim 1, wherein step (c) includes the steps of:
   (i) providing a beacon signal source at each of the plurality of nodes;
   (ii) maximizing received power of a beacon signal from said beacon signal source to direct said directed beam at said corresponding selected node; and
   (iii) maximizing received power of said information signal for establishing said respective communication link.

9. The method for dynamically configuring a topology of a communication network as recited in claim 8, wherein said received beacon signal power maximization of step (ii) includes the step of pointing said directed beam of said corresponding selected node with a coarse beam pointing mechanism along a direction at which said received power of said beacon signal is maximized.

10. The method for dynamically configuring a topology of a communication network as recited in claim 8, wherein said received information signal power maximization of step (iii) includes the step of pointing said directed beam of said corresponding selected node with a fine beam pointing mechanism along a direction at which said received power of said information signal is maximized.

11. The method for dynamically configuring a topology of a communication network as recited in claim 1, wherein step (c) includes the steps of:
   (i) scanning said directed beam corresponding to said communication link with said selected node to locate a position where received power of said scan data signal is maximized; and
   (ii) directing said directed beam at said position where said received power of said scan data signal is maximized.

12. The method for dynamically configuring a topology of a communication network as recited in claim 11, wherein said scanning of step (ii) is a conical scan.

13. The method for dynamically configuring a topology of a communication network as recited in claim 1, wherein step (c) includes the steps of:
   (i) transmitting a location code over said directed beam corresponding to communication link with selected node;
   (ii) receiving a location code from said corresponding selected node;
   (iii) directing said directed beam in accordance with said location code received in step (ii).

14. The method for dynamically configuring a topology of a communication network as recited in claim 1, wherein step (c) includes the steps of:
   (i) transmitting a beam pointing direction code over said directed beam corresponding to said communication link with said selected node;
   (ii) receiving a beam pointing direction code from said corresponding selected node;
   (iii) directing said directed beam in accordance with said beam pointing direction code received in step (ii); and
   (iv) repeating the method at step (ii) until said directed beam is directed at said selected node.

15. The method for dynamically configuring a topology of a communication network as recited in claim 1, wherein said link quality parameter is a bit error rate of said information signal.

16. The method for dynamically configuring a topology of a communication network as recited in claim 15 further including the step of maximizing received power of said information signal if said bit error rate exceeds a predetermined bit error rate threshold.

17. The method for dynamically configuring a topology of a communication network as recited in claim 16, whereby said received power maximization is performed by altering beam divergence of said directed beam of said corresponding selected node.

18. The method for dynamically configuring a topology of a communication network as recited in claim 1 further including the step of providing a secondary data channel for conveying secondary data to the plurality of nodes.

19. The method for dynamically configuring a topology of a communication network as recited in claim 18, wherein said locations of said selected nodes is determined in step (a) by receiving location information corresponding to the plurality of nodes as said secondary data over said secondary data channel.

20. The method for dynamically configuring a topology of a communication network as recited in claim 18, wherein said information signal is conveyed as secondary data over said secondary data channel.

21. The method for dynamically configuring a topology of a communication network as recited in claim 20, whereby said information signal is conveyed over said secondary data channel only if said information signal could not be conveyed via said communication link over said respective directed beam.

22. A method for configuring a topology of a communication network comprising the steps of:
   (a) providing the network with a plurality of nodes for affording access thereto, each of said plurality of nodes including a set of primary data channel transceivers and a set of secondary data channel transceivers;
   (b) locating positions of said plurality of nodes with respect to each node in the network and storing said positions in a position table at said each node;
   (c) determining link states of said plurality of nodes with respect to said each node in the network and storing said link states in a link state table at said each node;
   (d) at said each node in the network, selecting a current set of selected nodes from said plurality of nodes with which a corresponding communication link is to be established in accordance with information stored in said position table and said link state table and storing current selected node information in a connection table;
   (e) determining if said current selected node information indicates that said current set of selected nodes are interconnected by a closed signal path;

(f) directing each of said set of primary data channel transceivers of said each node toward a corresponding one of said current set of selected nodes in accordance with said current selected node information stored in said connection table;

(g) establishing said communication link over a primary data channel between said primary data channel transceiver of said each node and a corresponding primary data channel transceiver at each of said current set of selected nodes, said primary data channel carrying an information signal thereon;

(h) at said each node in the network, monitoring said communication link corresponding to each of said current set of selected nodes for communication quality with respect to a predetermined link quality parameter;

(i) adjusting transmitted power at said each node so as to maximize received power at each of said current set of selected nodes if said communication link monitoring of step (g) indicates said communication quality fails to meet said predetermined link quality parameter;

(j) at said each node, if said transmitted power adjustment step (h) fails to improve said communication quality to meet said predetermined link quality parameter, selecting a new set of selected nodes from said plurality of nodes with which a new communication link is to be established in accordance with information stored in said position table and said link state table and storing new selected node information in said connection table at said each node;

(k) determining if said selected node information indicates that said set of selected nodes are interconnected by a closed signal path and, if so, designating said new selected node information as said current selected node information;

(l) redirecting one of said set of primary data channel transceivers corresponding to one of said current selected nodes for which said communication link fails to meet said predetermined link quality parameter toward one of said new set of selected nodes;

(m) establishing said communication link over a primary data channel between each of said primary data channel transceivers of said each node and a corresponding primary data channel transceiver at each of said new set of selected nodes and designating said new set of selected nodes as said current set of selected nodes; and (n) repeating the method at step (h).

23. The method for configuring a topology of a communication network as recited in claim 22 further including the step of providing a directed beam of electromagnetic radiation at each of said primary data transceivers for conveying said information signal thereon.

24. The method for configuring a topology of a communication network as recited in claim 23, whereby said transmitted power is adjusted by altering beam divergence of said directed beam of said primary data transceiver corresponding to each of said current set of selected nodes.

25. The method for configuring a topology of a communication network as recited in claim 22, wherein said electromagnetic radiation of said primary data channel is of optical wavelength.

26. The method for dynamically configuring a topology of a communication network as recited in claim 22, wherein said link quality parameter is a bit error rate of said information signal.

27. The method for dynamically configuring a topology of a communication network as recited in claim 26 further including the step of maximizing received power of said information signal if said bit error rate exceeds a predetermined bit error rate threshold.

28. The method for dynamically configuring a topology of a communication network as recited in claim 27, whereby said transmitted power is adjusted by altering beam divergence of said directed beam of said primary data transceiver corresponding to each of said current set of selected nodes for which said bit error rate exceeds said predetermined bit error rate threshold.

29. The method for dynamically configuring a topology of a communication network as recited in claim 22, whereby said information signal is conveyed via said secondary data channel transceivers if said transmitted power maximization failed to establish said communication link of said communication link quality sufficient to meet said link quality parameter.

30. The method for dynamically configuring a topology of a communication network as recited in claim 29, wherein said secondary data channel transceivers are radio frequency broadcast transceivers.

31. The method for dynamically configuring a topology of a communication network as recited in claim 29, wherein said secondary data channel transceivers are optical frequency broadcast transceivers.

32. The method for dynamically configuring a topology of a communication network as recited in claim 22, wherein said set of secondary data channel transceivers is a set of a single secondary channel transceiver.

* * * * *

UNITED STATES PATENT AND TRADEMARK OFFICE
CERTIFICATE OF CORRECTION

| | | |
|---|---|---|
| PATENT NO. | : 6,990,350 B2 | Page 1 of 1 |
| APPLICATION NO. | : 10/615182 | |
| DATED | : January 24, 2006 | |
| INVENTOR(S) | : Christopher C. Davis, Stuart D. Milner and Igor I. Smolyaninov | |

It is certified that error appears in the above-identified patent and that said Letters Patent is hereby corrected as shown below:

Column 1, Line 15, insert the sentence --The development of the invention described herein was additionally funded under Air Force Office of Scientific Research, Grant Number F496200210217.--

Signed and Sealed this

First Day of August, 2006

JON W. DUDAS
*Director of the United States Patent and Trademark Office*